United States Patent
Dauphin et al.

(10) Patent No.: US 6,524,152 B1
(45) Date of Patent: Feb. 25, 2003

(54) BOTTOM TO SURFACE LINK SYSTEM COMPRISING A SUBMARINE PIPE ASSEMBLED TO AT LEAST ONE FLOAT

(75) Inventors: Raphaël Dauphin, Versailles (FR); Michaël Gassert, Saverne (FR); Valérie Quiniou, Paris (FR); Xavier Rocher, Chatou (FR)

(73) Assignee: Saipem s.a., Montigny le Bretonneux (FR)

( * ) Notice: Subject to any disclaimer, the term of this patent is extended or adjusted under 35 U.S.C. 154(b) by 0 days.

(21) Appl. No.: 10/030,702

(22) PCT Filed: Jul. 4, 2000

(86) PCT No.: PCT/FR00/01899

§ 371 (c)(1),
(2), (4) Date: Feb. 26, 2002

(87) PCT Pub. No.: WO01/04454

PCT Pub. Date: Jan. 18, 2001

(30) Foreign Application Priority Data

Jul. 13, 1999 (FR) .............................................. 99 09424

(51) Int. Cl.$^7$ .............................................. E21B 17/01
(52) U.S. Cl. ...................... 441/133; 166/367; 405/224.2
(58) Field of Search .......................... 441/133; 166/367, 166/350; 405/224.2, 224.4

(56) References Cited

U.S. PATENT DOCUMENTS

| | | | | |
|---|---|---|---|---|
| 2,476,309 A | | 7/1949 | Lang | 255/1.4 |
| 3,017,934 A | | 1/1962 | Rhodes et al. | 175/7 |
| 3,855,656 A | | 12/1974 | Blenkarn | 9/8 |
| 3,952,526 A | | 4/1976 | Watkins et al. | 61/46 |
| 3,957,112 A | * | 5/1976 | Knibbe et al. | 166/0.5 |
| 3,981,357 A | | 9/1976 | Walker et al. | 166/5 |
| 4,596,531 A | * | 6/1986 | Schawann et al. | 441/133 |
| 4,762,180 A | * | 8/1988 | Wybro et al. | 166/350 |
| 5,421,413 A | * | 6/1995 | Allen et al. | 166/335 |
| 5,641,248 A | * | 6/1997 | Arit, III | 166/350 |
| 5,683,205 A | * | 11/1997 | Halkyard | 166/350 |
| 6,257,337 B1 | * | 7/2001 | Wells | 166/350 |

FOREIGN PATENT DOCUMENTS

FR 2 754 011 9/1996 .......... E21B/17/01

* cited by examiner

*Primary Examiner*—Sherman Basinger
(74) *Attorney, Agent, or Firm*—Cohen, Pontani, Lieberman & Pavane (57) ABSTRACT

A bottom-to-surface link system includes a submarine pipe assembled to at least one float. At least one coaxial can surrounds the pipe. Junctions, which join the can to the pipe at the top and bottom orifices through which the pipe passes, include leakproof joints assembled around the pipe. Furthermore, the leakproof joints are flexible and resilient and are of the laminated abutment type.

14 Claims, 9 Drawing Sheets

BOTTOM TO SURFACE LINK SYSTEM COMPRISING A SUBMARINE PIPE ASSEMBLED TO AT LEAST ONE FLOAT

BACKGROUND OF THE INVENTION

1. Field of the Invention

The present invention relates to the known field of bottom-to-surface links of the type comprising a vertical submarine pipe known as a "riser" connecting the sea bed to a floating support located on the surface.

2. Description of the Prior Art

Once the depth of water becomes large, production fields, and in particular oil fields, are generally operated from floating supports. In general, such a floating support has anchor means to keep it in position in spite of the effects of currents, winds, and swell. Such a support generally also has means for storing and processing oil, and means for off-loading oil to off-loading tankers. Such tankers arrive at regular intervals to off-load production. Such floating supports are referred to by the initials FPSO (for floating, production, storage, off-loading). Numerous variants have been developed such as SPARS which are long floating cigar shapes held in position by catenary anchor systems, or indeed TLPs, i.e. tension leg platforms, in which the tension legs are generally vertical.

Well heads are often distributed over an entire field, and production pipes together with pipes for injecting water and cables for monitoring and control are placed on the sea bed to converge on a fixed installation with the floating support being positioned on the surface vertically above said installation.

Some wells are situated vertically beneath the floating support and the insides of such wells are. therefore directly accessible from the surface. Under such circumstances, a well head fitted with its "Christmas tree" can be installed at the surface on board the floating support. It is then possible using a derrick installed on said floating support to perform all of the drilling, production, and maintenance operations required by a well throughout the lifetime of said well. This is referred to as a "dry" well head.

To keep the riser fitted with its dry well head in a substantially vertical position, it is appropriate to exert upwardly directed traction near its top end, which traction can be applied either by a cable-based tensioning system using winches or hydraulic actuators installed on the floating support, or else by means of floats distributed along the riser and installed at various depths, or else by a combination of those two techniques.

U.S. Pat. No. 2,754,011 (IFP) discloses a barge and a guide system for a riser, the riser being fitted with floats.

SPARS and TLPs are also fitted with risers tensioned by floats.

When floats are used for tensioning purposes, it is necessary:

either to make syntactic foam elements that are installed as a half-shell around the riser;

or else to make floats out of metal or composite material, which floats are filled with gas, preferably an inert gas such as nitrogen.

Syntactic foam is a foam containing microbeads of glass impregnated in an epoxy or polyurethane type resin. This type of foam has exceptional ability to withstand pressure and it is commonly used at great depths. However this type of foam suffers from the drawback of being very expensive and difficult to make.

Since the depth of water over some oil fields exceeds 1500 meters (m), and can be as great as 2000 m to 3000 m, the weight of a riser over such a depth requires forces that can be as much as or greater than several hundreds of (metric) tonnes in order to enable them to be kept in position. For such extreme depths (1000 m–3000 m), buoyancy elements of the "can" type are used which are installed on the risers at various depths. The floats concerned are then of large dimensions, and in particular they can be of a diameter lying in the range 1.5 m to 5 m, or even greater than 5 m, and they can extend over a length of 10 m to 20 m in order to achieve buoyancy of as much as 100 tonnes.

The float and the pipe are subject to the effects of swell and of current, and because they are connected to an FPSO on the surface, they are also subjected indirectly to the effects of wind. This gives rise to considerable lateral and vertical movements (several meters) in the system comprising the riser, the floats, and the barge, particularly in the zone thereof that is subject to swell. These movements give rise to large differential forces between the riser and the float. In addition, the curvature taken up by the riser can give rise to very large bending moments in the change of second movement of area that arises where there is a connection between the riser and a float.

In order to minimize the forces generated by current and swell acting on the riser-and-float system, floats are generally circular and they are installed coaxially around the riser.

In addition, floats are generally fixed to a riser in such a manner as to ensure that the connection between a riser and a float is leakproof and capable of confining the filler gas within the float. The commonly-employed solution consists in mutual interfitting engagement between the float and the riser at the top and bottom ends of the float, backed up by welding. Numerous reinforcements are added to ensure that the assembly has sufficient strength.

At such a junction between a riser and a float, the second moment of area of the assembly (i.e. its resistance to bending) varies considerably on going from the section of the riser to the section of the float.

Such large variations in second moment of area give rise to poor stress distribution, thus giving rise to highly localized zones where stress can become unacceptable and can lead either to sudden breakage or else to fatigue, leading in turn to the appearance of cracks and then to ruin. In order to reinforce the sensitive zone, these localized stresses require transition pieces to be used, generally large conical pieces referred to as "tapered joints". In some cases, these pieces can be as much as 10 m long, and in the best of cases they require very high performance steels to be used. However, it is often necessary to use titanium which is about five to ten times more expensive than the best steels. Furthermore, these pieces are generally complex in shape and they must be made to extremely high standards in order to guarantee the service expected of them over the lifetime of such equipment which commonly exceeds 25 years.

U.S. Pat. Nos. 3,952,526 and 3,981,357 disclose junction systems between floating tanks and risers, where parts are used that are made of elastomer material.

Those buoyancy systems enable the tensioning system on board the floating support to be reduced and, in general, they are distributed over a large fraction of the depth of water, and in addition they present small buoyancy of up to a few hundreds of kg, or perhaps as much as 1 tonne or 2 tonnes.

The junctions are situated in the top portions of the floats, while the bottom portions of the floats are generally left open. Such devices can transfer loads corresponding to reducing the weight of a limited length of pipe, but they are not suitable for floats that are intended (on their own and without help from additional tensioning systems secured to the floating support) to support very long lengths of riser, e.g. 500 m to 1000 m, or even more, of the kind to be found in off-shore oil fields at greatdepth, i.e., in particular, at depths of more than 1000 m. The buoyancy required for providing tensioning by means of floats alone requires considerable forces to be transferred vertically and transversely, said vertical forces applied to the head of the riser being capable of reaching several hundreds of tonnes, and in particular lying in the range 300 tonnes to 500 tonnes.

SUMMARY OF THE PRESENT INVENTION

The object of the present invention is to provide a novel type of junction between a riser and a can so as to enable large loads to be supported and transferred while mitigating the drawbacks of the above-described floats assembled around said pipe by mutual engagement.

An object of the present invention is thus to provide a novel riser-and-float junction means that is simple, flexible, and reliable, mechanically speaking, and in particular that serves to reduce phenomena of fatigue and wear due to the stresses which act at the junction which is subjected to loads of several hundreds of tonnes.

Another object of the present invention is to provide a riser-and-float junction for a riser that is to be used in great depths, and that is essentially, or even solely, tensioned by floats of large dimensions.

For this purpose, the present invention provides a bottom-to-surface connection system comprising a submarine pipe assembled to at least one float having a coaxial can surrounding said pipe and junction means for joining said can to said pipe at top and bottom orifices of said can through which said pipe passes, the system being characterized in that:

said junction means comprise a resilient and leakproof flexible joint assembled around said pipe at at least one of the top and bottom orifices of said can;

said resilient and leakproof flexible joint includes a laminated abutment comprising a first plate secured to said pipe or to said can, and a second plate secured to said can or to said pipe, respectively, said plates sandwiching layers of elastomer and rigid reinforcement, said plates, elastomer layers, and reinforcement presenting surfaces of revolution about an axis constituted by the axis of said pipe and said duct when at rest; and said laminated abutment being:

a frustoconical plane laminated abutment constituted by a plurality of layers of elastomer and rigid reinforcement in the form of superposed washers, including a rigid plate of frustoconical shape inscribed within a frustoconical envelope surface, said frustoconical plate surmounting said plurality of superposed layers of elastomer and rigid reinforcement;

or else a cylindrical laminated abutment constituted by a plurality of layers of elastomer and rigid reinforcement in the form of adjacent coaxial tubes.

In said frustoconical or cylindrical laminated abutments, said layers of elastomer and rigid reinforcement can be continuous or discontinuous, and they are preferably continuous. The term "discontinuous" is used herein to mean that a layer is made up of a plurality of portions defining circular sectors which together make up one of said washers, or one of said frustoconical or cylindrical surfaces of revolution.

In another embodiment, said junction means comprise a flexible, resilient, and leakproof joint at each orifice of said can.

In another embodiment, said junction means comprise a leakproof joint at one of the orifices of said can, and in particular its top orifice, and a joint that is flexible, resilient, and leakproof at its other orifice.

More particularly, one of the top and bottom orifices of said can has a resilient, flexible, and leakproof joint constituted by a said cylindrical laminated abutment, and the other orifice has an abutment comprising a rigid plate of frustoconical shape with its larger base situated at its bottom end, and said plate preferably surmounts a said laminated abutment.

A flexible, resilient, and leakproof joint of the present invention transmits stresses at a junction:

in twisting movement of said pipe relative at least to axes perpendicular to the axis of said can such that the axis of said pipe can depart angularly from the axis of said can at said orifices, with the angle between the axis of said pipe and the axis of said can at one of said orifices preferably varying over a range of 0 to 10°, and more particularly over a range of 0 to 5°; and in movement(s) of said pipe including a component in translation transversely to said can in directions perpendicular to the axis of said can such that the axis of said pipe can depart transversely from the axis of said can within said orifices, and more particularly the axis of said pipe can depart from the axis of said can by 0 to 5 cm.

Advantageously, said frustoconical plate has a central cylindrical cavity that is secured to said pipe, and said layers of elastomer and rigid reinforcement in the form of superposed washers are inscribed with a frustoconical envelope surface.

In an advantageous embodiment, said frustoconical plate is an integral portion of the riser.

The conical shape in accordance with the present invention contributes to transmitting vertical forces to said pipe in a manner which is progressive. The vertical thrust that acts on the can is transmitted via the laminated abutment in the direction of the axis of said pipe. Said laminated abutment presents much lower stiffness in directions that are perpendicular thereto, said transverse stiffness being adjustable as a function of the quality of the elastomer, the thickness of the various layers of elastomer, and the number of such layers.

More particularly, the cylindrical laminated abutment has an inner first rigid cylindrical plate secured to the outside surface of said pipe and an outer second rigid cylindrical plate secured to said can, preferably via an annular flange.

The cylindrical shape of the laminated abutment of the invention confers low stiffness to said abutment along the axis of said can and of said pipe, and transmits practically no force in this vertical direction. In contrast, this cylindrical shape presents stiffness in directions perpendicular to thereto which favors the transfer of load between the can and the pipe while also allowing twisting about the transverse axes, and to a smaller extent about the vertical axis.

The combination of a frustoconical plane laminated abutment and a cylindrical laminated abutment favors all twisting and translation movement at the orifices as mentioned above, said twisting movements being associated with said pipe curving within said can.

The buoyancy of said submarine pipe is preferably provided by said floats without adding additional tensioning systems, in particular without systems operating by means of cables that are secured to the floating support.

BRIEF DESCRIPTION OF THE DRAWINGS

Other characteristics and advantages of the present invention appear in the light of the following detailed description, given with reference to the following figures, in which:

FIGS. 2 to 5 thus show the relative movements possible between a top plate and a bottom plate under the effect of various loads described below; by way of example, the elastomer layers can be compressed by any amount lying in the range 0 to 5 cm;

FIG. 2 is a side view of a laminated abutment that is not subjected to force;

FIG. 3 is a side view of the same laminated abutment subjected to a compression force $F_v$, causing its thickness to be reduced;

FIG. 4 is a side view of the same laminated abutment $3_1$ subjected to a shear force $F_h$ giving rise to lateral displacement in the direction of the force;

FIG. 5 is a side view of the same laminated abutment $3_1$ subjected to two forces in combination, a horizontal force $F_h$ giving rise to shear and a vertical force $F_v$ giving rise to compression, with the vertical force being off-center, as represented in this case by the abutment tilting with its right-hand side sagging;

FIG. 6 is a section view of the float, in which the left half of the figure shows the float in its out-of-water position, while the right half of the figure shows the same float when immersed, the vertical thrust $F_v$ being transmitted to the conical part 9 via the plane laminated abutment $3_1$ at the top, thereby subjecting it to compression, with the cylindrical abutment $3_2$ at the bottom then being subjected to shear only;

FIG. 7 is a side view of a riser associated with a can in side view and in section, the can having at its top end a circularly symmetrical cylindrical laminated abutment that is assembled via a flange to the float, and at its bottom end a circularly symmetrical plane laminated abutment likewise assembled to the can via a flange;

FIG. 8 is a section view of a free float 1 in air or water, with the riser 2 being deformed about a radius of curvature R, thereby deforming each of the abutments $3_1$ and $3_2$ with a combination of differential shear and compression forces;

DETAILED DESCRIPTION OF THE PRESENTLY PREFERRED EMBODIMENTS

In the embodiments of FIGS. 1 to 10, the laminated abutments comprise layers of elastomer and of metal reinforcement between plates having circularly symmetrical surfaces about an axis constituted by the axis ZZ' of said pipe and of said can when at rest.

To clarify the description of the invention, the pipe-and-can assembly is described relative to an orthogonal frame of reference XYZ whose axis ZZ' coincides with the axis of the pipe and the can at rest, whose axis XX' lies in the plane of the figure, and whose axis YY' lies in the plane perpendicular to the Figure.

In FIGS. 1, 6, 7, and 8, the plane laminated abutment is a frustoconical plane laminated abutment comprising a rigid bearing part 9 of frustoconical shape secured via its base to a layer of elastomer 7 in the form of a washer, said frustoconical part having a central cylindrical cavity secured to said pipe, and said elastomer layers 7 and said rigid pieces of reinforcement 8 in the form of superposed washers are inscribed within a frustoconical envelope surface.

Figure 1:
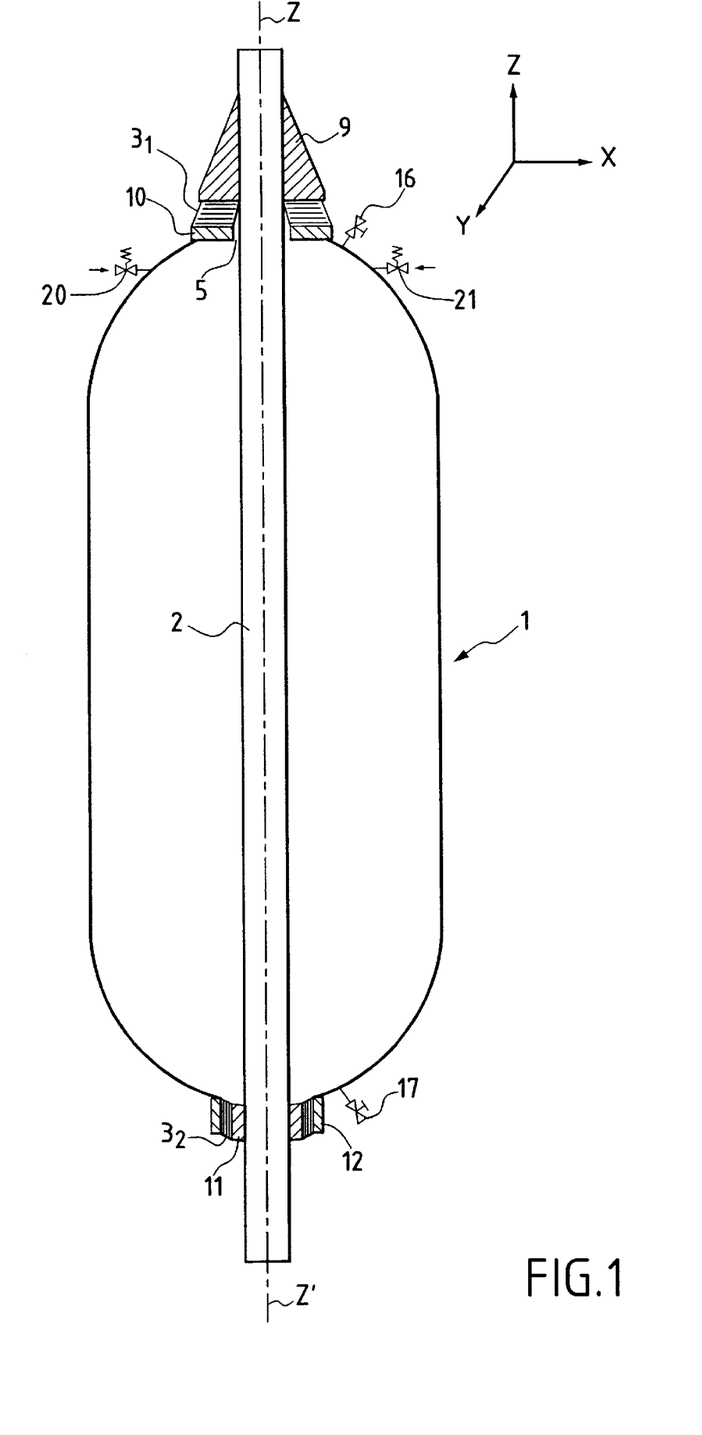
FIGS. 1 and 6 to 8 are side views of a riser associated with a can 1 shown in section and in side view and fitted on top with a plane laminated abutment $3_1$ that is circularly symmetrical, and at the bottom with a cylindrical laminated abutment $3_2$ that is likewise circularly symmetrical.
Figure 2:
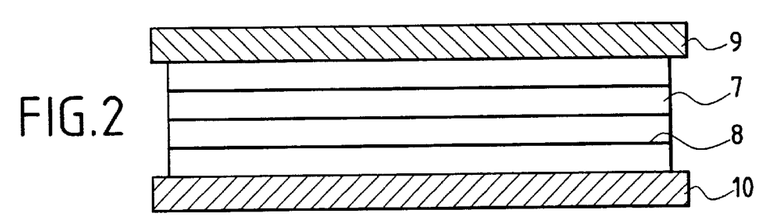
FIGS. 2 to 5 are sections through a segment of laminated abutment in accordance with the invention showing how it makes both lateral displacements and twisting possible while still being capable of supporting considerable vertical loads and sagging very little; the laminated abutment is constituted by a top plate 9 and a bottom plate 10 (or an outer plate 12 and an inner plate 11) sandwiching between them layers of elastomer 7 and of sheet metal reinforcement 8.
Figure 3:
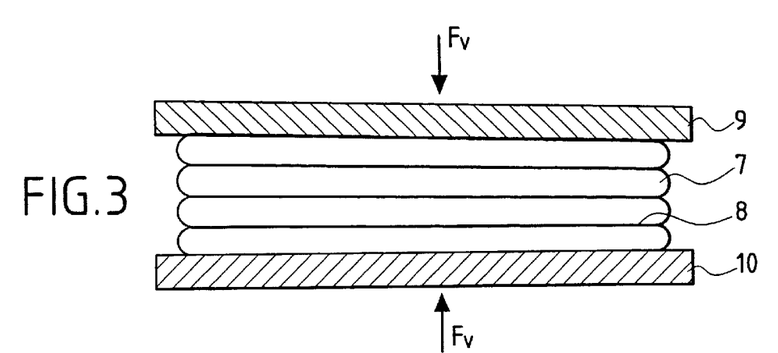
Figure 4:
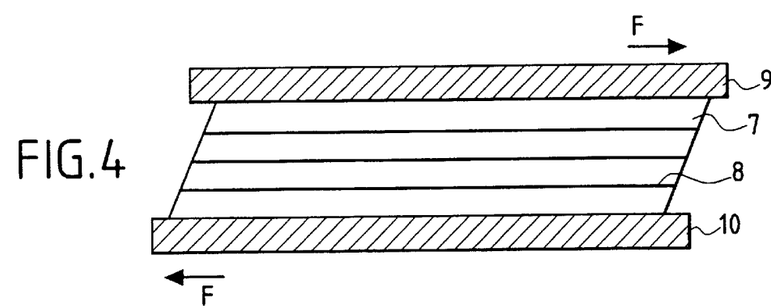
Figure 5:
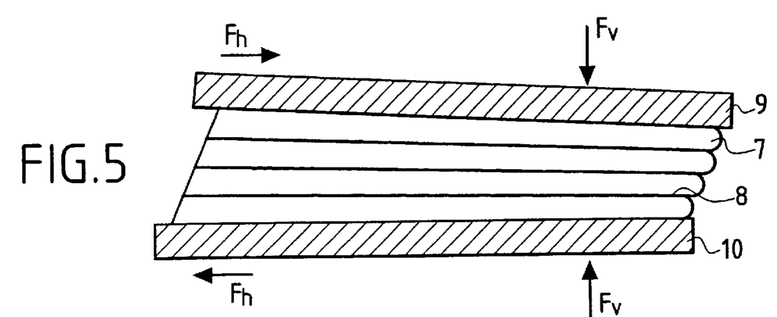
Figure 6:
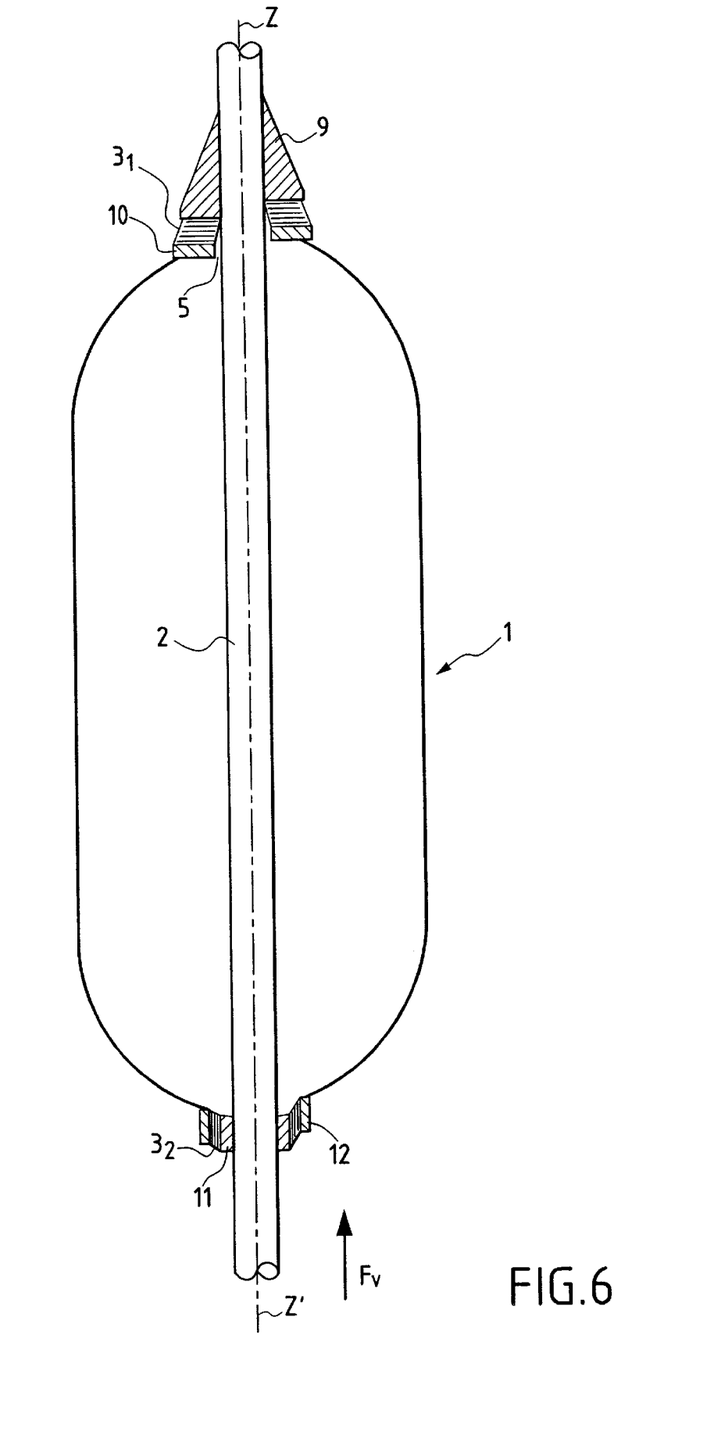

In FIG. 1, the apparatus comprises:

a frustoconical plane laminated abutment $3_1$ at the top end of said can, above the top orifice 5 of said can; and a cylindrical laminated abutment $3_2$ at the bottom end of said can, beneath the bottom orifice 6 of said can.

In FIGS. 1 to 10, the cylindrical laminated abutment is a cylindrical abutment made up of layers of elastomer 7 and of rigid reinforcement 8 in the form of adjacent coaxial tubes.

More particularly the cylindrical laminated abutment comprises an inner cylindrical rigid plate 11 secured to the outside surface of said pipe, and an outer cylindrical rigid plate 12 secured to said can via an annular flange 13 of said outer cylindrical rigid plate.

Figure 7:
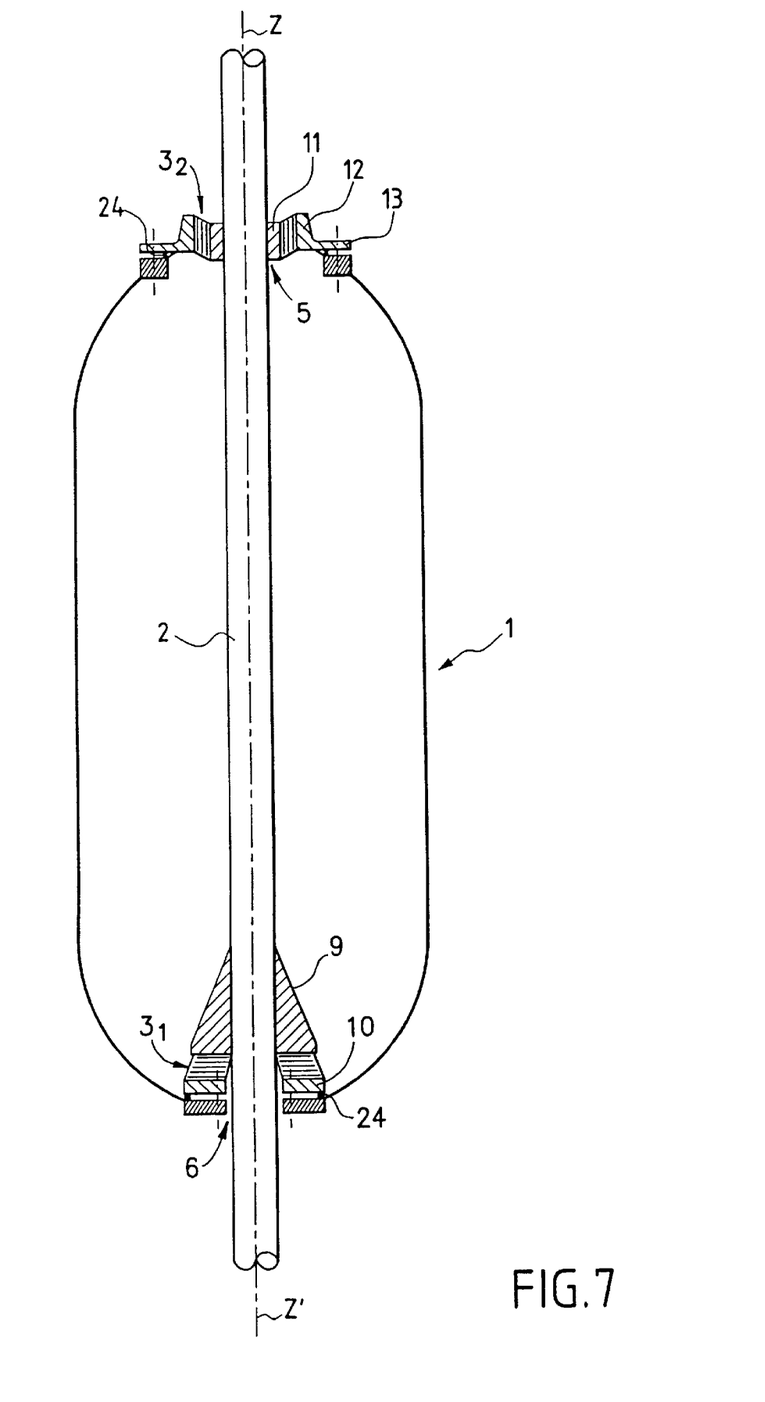

In FIG. 7, the apparatus comprises:

a frustoconical plane laminated abutment $3_1$ at the bottom end of said can, above the bottom orifice 6 and inside said can; and a cylindrical laminated abutment $3_2$ at the top end of said can, above the top orifice 5 and outside said can.

Figure 8:
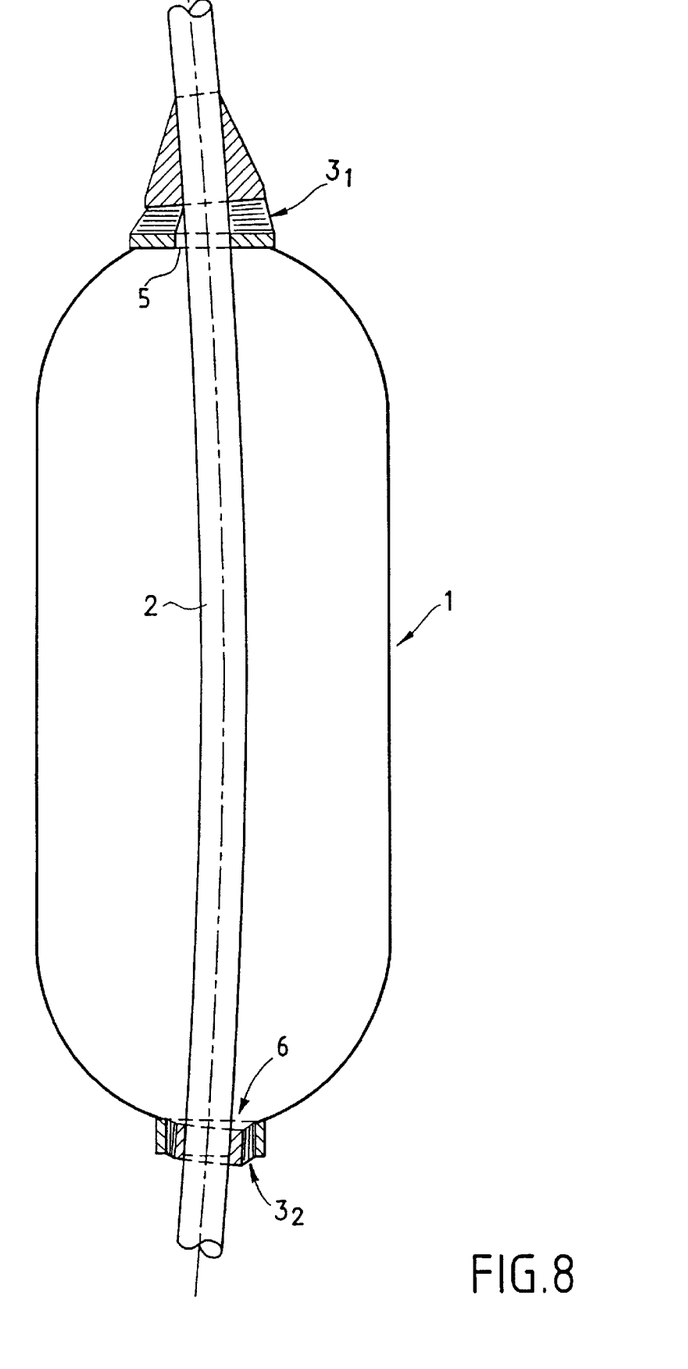
Figure 9:
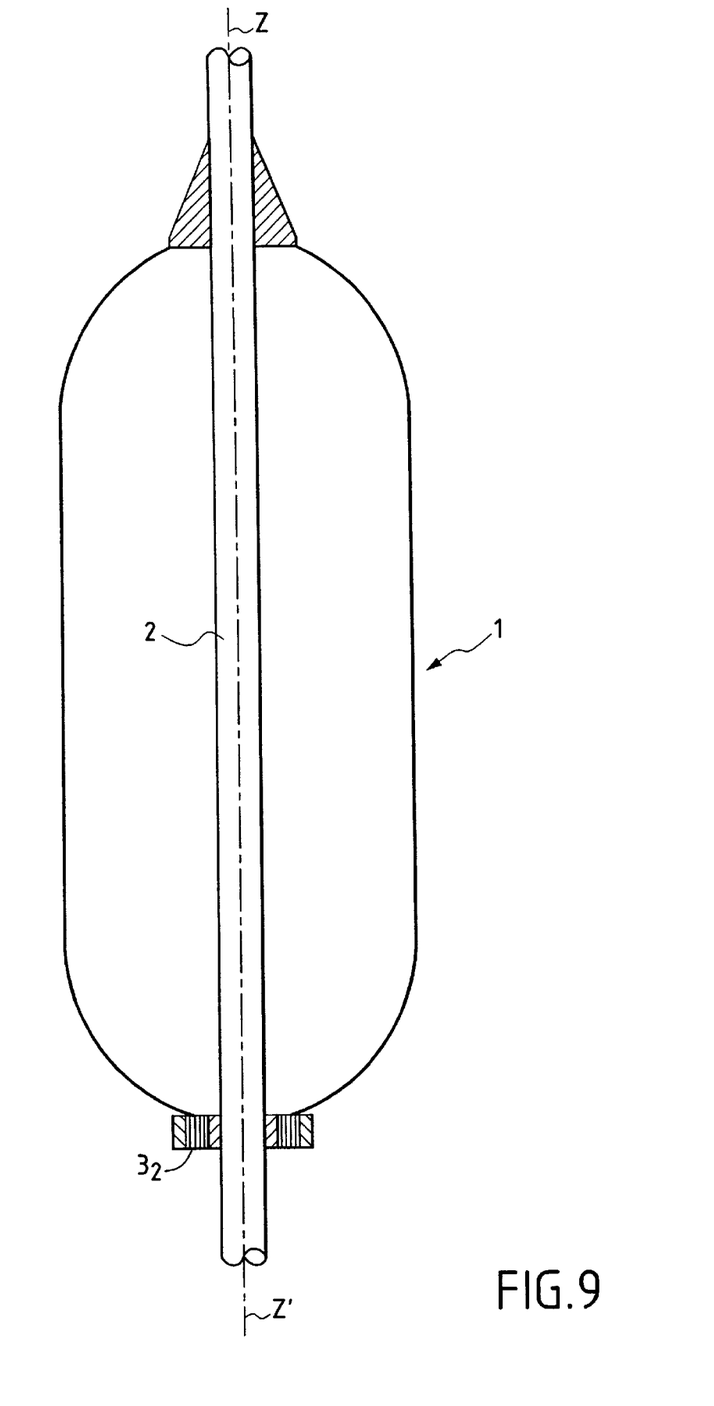
FIG. 9 is a section view of a can fixed rigidly to the riser at its top end (no laminated abutment) and possessing at its bottom end a cylindrical laminated abutment $3_2$ capable of large-amplitude displacement and operating essentially in compression, as shown in FIG. 10.
Figure 10:
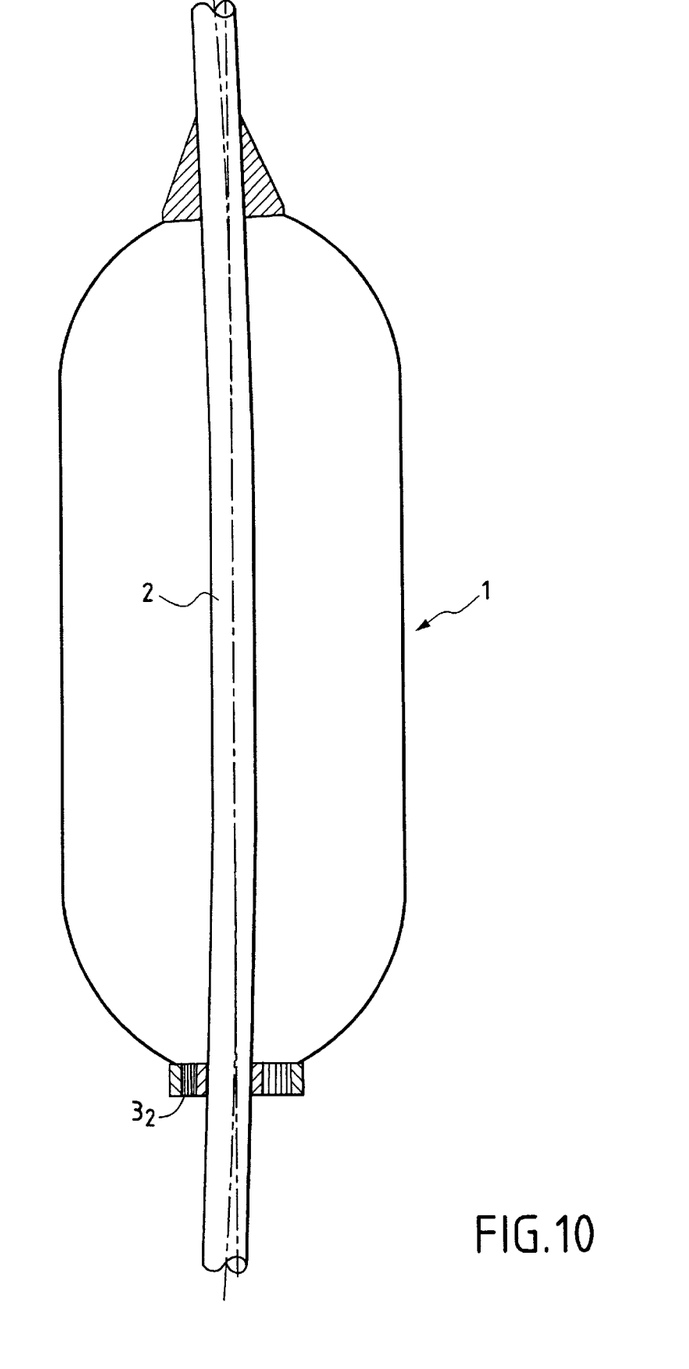
FIG. 10 is a section view of the FIG. 9 can, showing the curvature of the riser 2 which remains tangential to the axis of the float 1 at the top conical engagement part 9, while the bottom laminated abutment $3_2$ absorbs all of the deformation so that the axis of said pipe can move angularly and transversely away from the axis of said can at said orifice.

The combined compression and horizontal shear forces acting on said laminated abutment as shown in FIGS. 2 to 5 give to and authorize twisting movements of said pipe 2 relative to the can about the axes XX' and YY' that are perpendicular to the can axis ZZ', together with some movement in translation and of small amplitude at said orifices (see FIG. 8).

From FIG. 8, it can be seen that the assembly comprising the can 1 and the pipe 2 including the frustoconical plane laminated abutment 31 and the cylindrical abutment $3_2$ provides flexibility and resilience at the junctions at the top and bottom orifices of the can, thereby decoupling movement between the can 1 and the pipe 2 while ensuring that the apparatus remains leakproof.

According to the invention, the float is dimensioned so as to have positive internal pressure during each stage of the operation, from preparation on the surface prior to installation, during installation, and throughout its operating lifetime.

In a preferred embodiment of the float, its cylindrical portion is constituted merely by rolled sheet metal of thickness that is determined to take account of the pressure difference between the inside of the float and the outside of the float, with the ends of said float being curved surfaces approximating to paraboloids of revolution or merely to hemispheres. Determining the necessary thicknesses and the safety factors imposed by regulations comes within the competence of the person skilled in the art in the field of pressurized tanks and is therefore not described in detail herein. The float of the invention is never at a pressure that is lower than that of its surroundings, and consequently it requires no internal reinforcement, and thus possesses a good ratio of buoyancy over the weight of its structure.

The top laminated abutment 31 is constituted by a metal conical part 9 secured to the riser 2 and providing the top plate 9, and a metal bottom plate 10 which is secured to the body of the float at the orifice 5. The conical top plate 9 is assembled to the riser 2 either by screw engagement, or by welding, or indeed by structural adhesive.

When screw engagement is used, the assembly can be sealed by means of gaskets that are not shown, or more simply by applying adhesive to the screw threads before final engagement.

Figure 12:
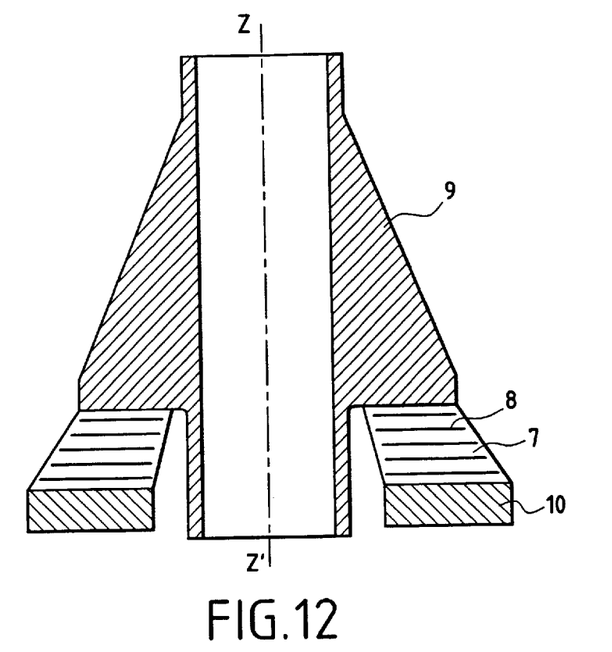
FIG. 12 is a side view of the conical plate 9 in section associated with a portion of riser 2 and obtained by forging and machining, this part being shown prior to the layers of elastomer 7 and the metal reinforcement 8 being put into place.

In an embodiment of the invention as shown in FIG. 12, the top frustoconical plate 9 is an integral portion of the riser. To this end, the plate 9 is manufactured with a portion of riser 2 extending from each end thereof, e.g. 30 cm upwards and 60 cm downwards. The assembly is advantageously obtained by forging a single ingot, including a tube blank at a diameter that is less than the final diameter. After forging, the part is machined to its final dimensions and the elastomer components are assembled by adhesion and vulcanization or by polymerization on the top and bottom plates in a manner known to the person skilled in the art.

The assembly can be assembled to the top portion of the riser and to the bottom portion by any conventional means such as welding, screw engagement, or indeed via flanges with sealing gaskets.

Figure 13:
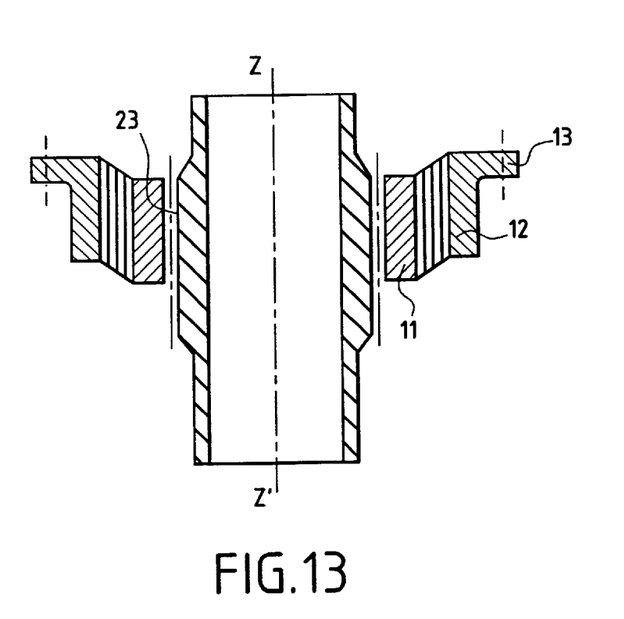
FIG. 13 is a side view in section of a segment of riser obtained by forging and machining, presenting a thread 23 in its reinforced zone whereby it is screwed and stuck to the bottom plate 11 of a circularly symmetrical cylindrical laminated abutment.

In the same manner, the inner plate 11 of the bottom abutment can be obtained by being forged together with a portion of the riser, but because forces in this region of the float are much smaller, the plate can be secured to the outside wall of the riser merely by welding, screw engagement, or adhesive, as shown in FIG. 13.

In a particularly advantageous embodiment of the invention, the frustoconical plate 9 transferring vertical force to the riser is installed at the bottom of the float. Under such circumstances, said frustoconical abutment 9 lies inside said float and the cylindrical abutment is then installed at the top of the float, as shown in FIG. 7.

By operating in this way, the buoyancy force gives rise inside the wall of the float to vertical traction forces, and as a result the float pulls the riser upwards, whereas in the previously-described configuration the forces due to buoyancy are transmitted to the conical plate secured to the riser by compression in the wall of the float. The float then pushes the riser upwards. By operating in this way, the risk of the wall of the float buckling is reduced since the stresses due to transferring up-thrust and the stresses due to internal pressure within said wall are all in traction.

The riser can be made on board the barge by assembling together successive unit segments, generally in multiples of 12 meters (m). Methods of step-by-step assembly are known to the person skilled in the art of off-shore drilling and are not described herein in detail. Such assembly is performed either by screw engagement, or by welding, or indeed by flanges.

Most of the elements of the riser are simple tubes, only a few of the elements carry floats of the invention. These are installed at different locations in the water depth, with their shape and volume being optimized as a function of sea and weather conditions and as a function of depth on site. Thus, by way of purely illustrative example, a 60-tonne float may be installed at a depth of –30 m, a 20-tonne float at a depth of –50 m, and a series of five 5-tonne floats may be installed every 10 m starting from a depth of –100 m.

To make it easier to install, the can is advantageously fitted with a first orifice having a filler valve 16 situated through a high portion of the can close to its top, and a second orifice provided with an exhaust valve 17 located near its bottom. While the float is being lowered in the water, both orifices are open and the float fills completely with water. Once the riser is in its final position, a tubular pipe rising to the surface is connected to the top orifice and gas is injected under a pressure greater than the pressure of water corresponding to the depth of said float. The gas expels the water which escapes through the bottom orifice. Once the float has been emptied of its water, gas begins to escape from the bottom orifice. The bottom valve 17 is then closed and gas continues to be injected until the pressure inside the float reaches some previously determined value.

By way of example, if it is desired to achieve a pressure differential of 2 bars between the inside and the outside at the top of a float that is 10 m tall and that is installed at a depth of –50 m, and given that the pressure at said depth is substantially 5 bars, then the pressure of the gas should be 7 bars. It may be observed that although the pressure differential at the top of the float is indeed 2 bars, it is no more than 1 bar at the bottom of the float since the external pressure corresponding to –60 m is approximately 6 bars.

In FIG. 1, the can 1 is also fitted at its top with a safety discharge valve 20 rated, in particular, at +2 bars, so as to provide "anti-explosion" safety, and it is also provided with a safety discharge valve 21 rated, in particular, at –1 bar to provide "anti-implosion" safety in the event of a leak occurring in that portion of the pipe which lies within the can or of a leak occurring in the outer wall of the can, or via said flexible joints.

The pressure values given above correspond to the maximum acceptable pressure differential between the inside and the outside for avoiding an explosion, i.e. ruin by bursting, or implosion, i.e. ruin by the can buckling.

The ratings of these two safety devices depend on operating limits that are determined by calculation on the basis of the strength of the can wall.

Means for monitoring the main parameters (pressure, temperature, operating states of the safety valves) in real time are installed on the can and the corresponding information is transmitted to the surface.

Buoyancy is advantageously adjusted by ballasting the float using said two orifices to inject or to remove a certain volume of water and simultaneously to purge or to reinject gas so as to keep the stresses in the various mechanical components within acceptable ranges. All such purging or ballasting operations can be performed either by a diver, or by means of a remotely operated vehicle (ROV) controlled from the surface and fitted with various tools such as manipulator arms.

The inside of the can be filled in part with foam.

The laminated abutments are described as having reinforcement 8 that is plane or cylindrical, however said reinforcement 8 could also be conical or spherical or could have some other shape. The reinforcements can be continuous or discontinuous, e.g. in the form of sectors. In particular, a result similar to the cylindrical abutment can be obtained by means of a toroidal envelope containing a fluid (like an inner tube). Movements then give rise to deformation of the torus with fluid being transferred within the torus. This is particularly suitable for the bottom joint and more particularly so for the example of FIGS. 9 and 10 where a large amount of clearance is required.

Figure 11:
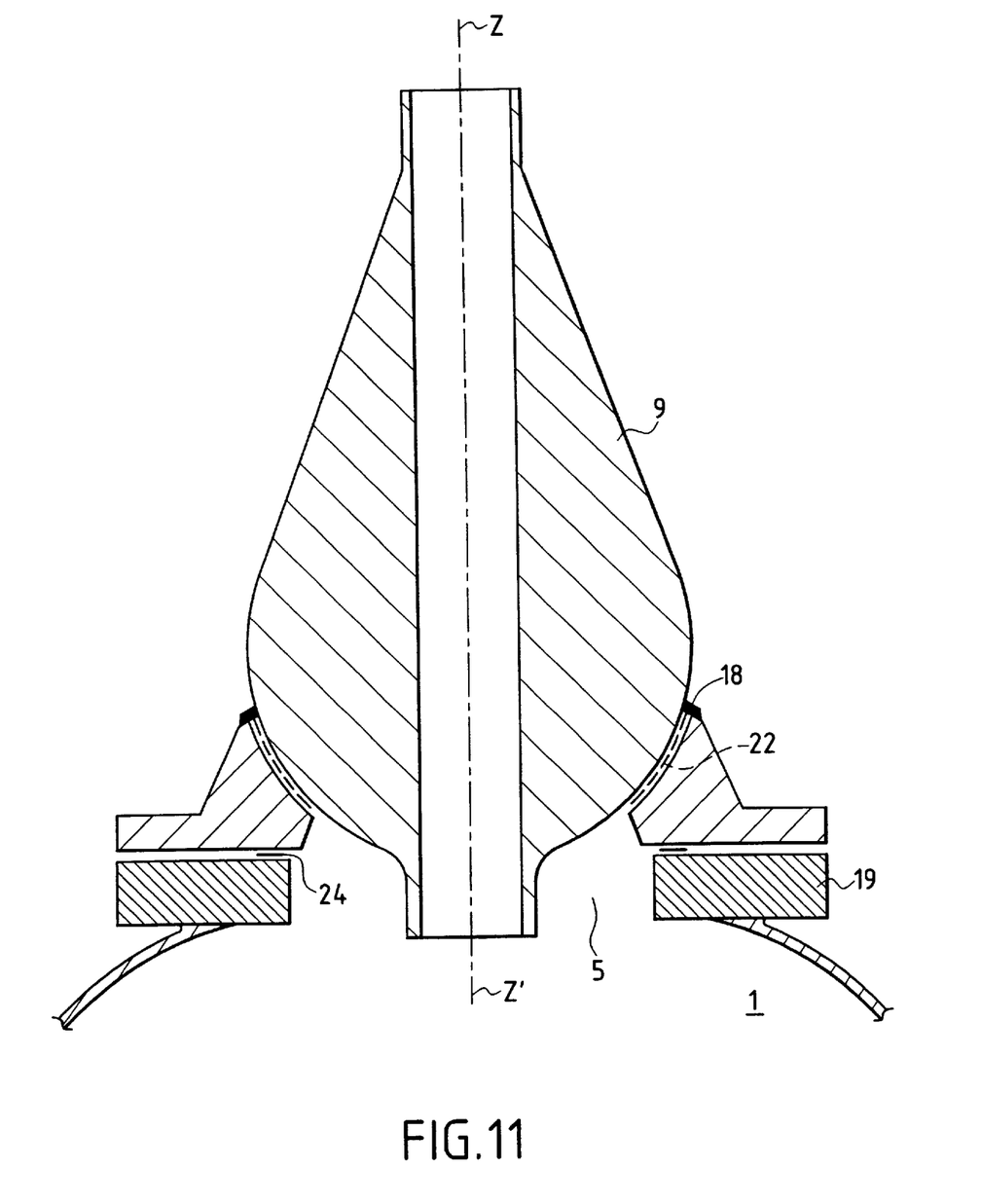
FIG. 11 is a section view of the top portion of the riser in which the joint is implemented by a spherical ball 9 provided with a low friction intermediate membrane 22 and also with a sealing gasket 18, and assembled to a flange 19 that is secured to the float, the assembly being sealed by a gasket 24.

It will be observed that in the embodiment of FIG. 11 that has a spherical ball replacing a laminated abutment, movement of the pipe relative to the can has a greater degree of freedom in rotation about the axis ZZ' and any axis perpendicular to thereto, but without any component in translation.

What is claimed is:

1. A bottom-to-surface connection system for connecting a floating support to a bottom surface comprising a submarine pipe assembled to at least one float having a coaxial can surrounding said pipe and junction means for joining said can to said pipe at top and bottom orifices of said can through which said pipe passes, the system being characterized in that:

said junction means comprise a resilient and leakproof flexible joint assembled around said pipe at at least one of the top and bottom orifices of said can;

said resilient and leakproof flexible joint includes a laminated abutment comprising a first plate secured to said pipe or to said can, and a second plate secured to said can or to said pipe, respectively, said plates sandwiching layers of elastomer and rigid reinforcement, said plates, elastomer layers, and reinforcement presenting surfaces of revolution about an axis ZZ' of said pipe and said can when at rest; and said laminated abutment being:

a frustoconical plane laminated abutment constituted by a plurality of layers of elastomer and rigid reinforcement in the form of superposed washers, including a rigid plate of frustoconical shape inscribed within a frustoconical envelope surface, said frustoconical plate surmounting said plurality of superposed layers of elastomer and rigid reinforcement;

or else a cylindrical laminated abutment constituted by a plurality of layers of elastomer and rigid reinforcement in the form of adjacent coaxial tubes.

2. A system according to claim 1, wherein that said junction means comprise at least one of said resilient and leakproof flexible joints at each of said orfices.

3. A system according to claim 1, wherein that said frustoconical plate has a central cylindrical cavity secured to said pipe.

4. A system according to claim 1, characterized in that said layers of elastomer and rigid reinforcement in the form of superposed washers are inscribed in a frustoconical envelope surface.

5. A system according to claim 1, characterized in that said laminated abutment comprises an inner cylindrical rigid plate secured to the outer surface of said pipe and an outer cylindrical rigid plate secured to said can, preferably via an annular flange.

6. A system according to claim 1, characterized in that said frustoconical plane laminated abutment is placed at the top end of said can above said top orifice and outside said can.

7. A system according to claim 1, characterized in that it comprises:

a frustoconical plane laminated abutment at the top end of said can above the top orifice of said can; and a cylindrical laminated abutment at the bottom end of said can, beneath the bottom orifice of said can.

8. A system according to claim 1, characterized in that one of said top and bottom orifices of said can has a flexible and leakproof resilient joint constituted by a said cylindrical laminated abutment, and that the other of said orifices has an abutment comprises a rigid plate of frustocollical shape with the larger base of said frustoconical shape being situated at its bottom end.

9. A system according to claim 8, wherein said plate surmounts one of said laminated abutments.

10. A system according to claim 1, characterized in that said frustoconical plate is an integral portion of the pipe.

11. A system according to claim 1, characterized in that it comprises:

a frustoconical plane laminated abutment at the bottom end of said can above the bottom orifice and inside said can; and a cylindrical laminated abutment at the top end of said can.

12. A system according to claim 1, characterized in that said flexible joint transmits stresses at the junction:

for twisting movements of said pipe relative at least to axes XX', YY' perpendicular to the axis ZZ' of said can, such that the axis of said pipe can depart angularly from the axis of said can at said orifices; and movement(s) including a component in translation extending transversely to said pipe relative to said can at least in directions XX', YY' that are perpendicular to the axis ZZ' of said can, such that the axis of said pipe can depart transversely from the axis of said can within said orifices.

13. A system according to claim 1, characterized in that said can has at least two rated safety valves respectively against explosion and against implosion in the event of a leak occurring in that portion of said pipe which is situated inside said can or inside the envelope of said can or in said flexible joint.

14. A systemic according to claim 1, characterized in that the buoyancy of said submarine pipe is provided by said can of said at least one float without adding additional tensioning(y means secured to the floating support.

* * * * *